UNITED STATES PATENT OFFICE.

IWAN IWANOWITSCH KONONOFF, OF ASTRAKHAN, RUSSIA.

PROCESS OF PRESERVING FISH.

1,002,707.  Specification of Letters Patent.  Patented Sept. 5, 1911.

No Drawing.  Application filed May 4, 1909. Serial No. 493,841.

*To all whom it may concern:*

Be it known that I, IWAN IWANOWITSCH KONONOFF, a subject of the Czar of Russia, and residing at Astrakhan-on-the-Volga, Russia, have invented a certain new and useful Improvement in Processes of Preserving Fish, of which the following is a specification.

The subject-matter of my invention is an improved process of preserving fish by salting them.

Fish have always been preserved heretofore by a number of them being placed in layers on the bottom of a suitably large receptacle, when granular salt was strewed upon them, a new layer of fish was put into the receptacle, whereupon another layer of salt followed, and so on. In most instances, however, it is necessary in addition to provide for a suitably low temperature simultaneously with the salting operation, the work of salting the fish generally being done in ice-cellars in order to prevent the destruction of the preserved and already salted fish. But it is also generally necessary to use a low temperature when the fish are conveyed from the fishing ground to land or to the place of treatment, especially as in most instances there is a period of several days between the time of catching and working up. In such instances, therefore, it is necessary to provide the steamer accompanying a fishing fleet with suitable refrigerating chambers, in order to obtain tolerably good material for working up. Nevertheless the percentage of spoiled fish is always relatively large. In addition, however, in the process of salting customary heretofore, the action of the salt on the bodies of the fish is by no means uniform in spite of the described mode of operation, and very frequently parts of the fish are sufficiently preserved, whereas other parts, which are not properly exposed to the action of the salt, are more or less spoiled. Also the circumstance that the fish are arranged in numerous superposed layers and consequently the lower layers are subjected to relatively severe pressure, causes the action of the gradually dissolving salt on the compressed bodies of the fish in these lower layers to be insufficient, so that it sometimes happens that the surface of the fish appears to be preserved, whereas in the interior, where the salt or the salt solution could not penetrate, decay has already occurred. For these reasons it follows that the manner of preserving fishes by salting usual heretofore is insufficient, as relatively large losses occur; moreover, carrying such a process of preserving into practice requires very exceptionally large means and plants, as otherwise the business cannot be made a commercial success. Lastly, as this known process is connected with the employment of a relatively large quantity of salt, it will also be readily understood that such a process can only be used in districts where salt and ice are sufficiently and cheaply at disposal. By way of example it may be mentioned that the above described, known process of preserving fish is employed most extensively in south Russia, but that it has heretofore been found impossible to introduce this process into Siberia and Persia in consequence of the want of salt in the former and ice in the latter country, regarded from a commercial standpoint.

Now a primary object of my invention is to provide a process of preserving fish by salting which is materially simpler than preserving processes known heretofore, and one in which on the one hand the quantity of salt used is diminished, and on the other hand can be carried into practice immediately after the fish are caught and consequently does away with the employment of refrigerating chambers which was necessarily extensive heretofore.

According to my invention the fish are not salted with granular, solid salt which only goes into solution and must penetrate as such more or less in the course of time into the bodies of the fish, but, on the contrary, the salt is used from the very first in the form of a solution and is injected directly into the bodies of the fish themselves by means of a suitable syringe. The salt solution is injected immediately after the fish have been caught and killed, and before the circulation of the blood ceases, the syringe filled with salt solution being introduced with its point at a suitable place under the scales of the fish and a definite quantity of the salt solution injected. The quantity of the salt solution, the size of the syringe, particularly its point, depend of course on the size and kind of the fish. In general it has been found preferable to use a rather larger quantity of salt than is absolutely necessary for preserving the fish. The color and shape of the scales, fins and particularly also the shape and color of the eye, as well as the appearance of the flesh is not changed at all, so that, as compared with products obtained heretofore, a considerable improvement is obtained. Also, however, this injection of the salt solution immediately after the fish have been caught and killed causes the entire fish to be preserved at once, since the salt solution becomes distributed uniformly in the body of the fish, and consequently even in somewhat warm districts the employment of cold means for preserving is entirely superfluous. Therefore the fish can be preserved in the described manner either on the smacks belonging to the fishing fleet or on the steamers accompanying the same without the steamers being provided with the otherwise necessary refrigerating chambers. Likewise, of course, the otherwise necessary treatment of the fish on land in the large ice-cellars is done away with, the large ice-cellars which were necessary heretofore also being saved. The fish can be packed on land in the manner usual heretofore, but of course it is no longer necessary to use granular salt now, as the fish are packed ready salted.

It will be readily understood from the above that the employment of my preserving process is applicable not only to the rich and well fitted-up fisheries as heretofore, but also to poorer fishers. Likewise it follows from the above that my process can also be used in those countries and districts where salt *per se* is relatively dear and rare because the quantity of salt necessary for preserving a fish is only about one half of that required according to processes known heretofore and acts very intensively on every individual fish.

I claim:—

1. The herein described process of preserving fish, which consists in killing the fish, and then injecting before the circulation of the blood ceases a solution of salt into the body of the fish.

2. The herein described process of preserving fish, which consists in first killing the fish, and then injecting before the circulation of the blood ceases, a pure salt solution at one or more places under the scales of the fish.

In testimony, that I claim the foregoing as my invention, I have signed my name in presence of two subscribing witnesses.

IWAN IWANOWITSCH KONONOFF.

Witnesses:
WOLDEMAR HAUPT,
HENRY HASPER.